(12) United States Patent
Röhm

(10) Patent No.: US 6,550,785 B2
(45) Date of Patent: Apr. 22, 2003

(54) LOCKABLE HAMMER-DRILL CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 38 days.

(21) Appl. No.: 09/772,416

(22) Filed: Jan. 30, 2001

(65) Prior Publication Data

US 2002/0089127 A1 Jul. 11, 2002

(30) Foreign Application Priority Data

Jan. 11, 2001 (DE) .......................... 101 01 212

(51) Int. Cl.$^7$ ............................................... B23B 31/12
(52) U.S. Cl. ......................................... 279/62; 279/140
(58) Field of Search ........................... 279/62, 902, 140

(56) References Cited

U.S. PATENT DOCUMENTS

| | | | |
|---|---|---|---|
| 4,824,298 A | * 4/1989 | Lippacher et al. | 279/62 |
| 5,322,303 A | * 6/1994 | Nakamura | 279/62 |
| 5,431,420 A | * 7/1995 | Huff et al. | 279/62 |
| 5,765,839 A | 6/1998 | Rohm | 279/62 |
| 5,816,582 A | * 10/1998 | Steadings et al. | 279/140 |
| 6,007,071 A | * 12/1999 | Middleton | 279/62 |
| 6,217,033 B1 | * 4/2001 | Sakamaki et al. | 279/140 |
| 6,260,856 B1 | * 7/2001 | Temple-Wilson | 279/140 |

* cited by examiner

Primary Examiner—Steven Wong
(74) Attorney, Agent, or Firm—Herbert Dubno; Andrew Wilford

(57) ABSTRACT

A drill chuck has a chuck body rotatable about a chuck axis and formed centered on the axis with an axially forwardly open tool receiving hole, an array of axially extending guides opening axially forward into the hole, a rear axially forwardly directed shoulder and a front axially forwardly directed shoulder. Respective externally toothed jaws axially displaceable in the guides mesh with an internally threaded actuating ring rotatable on the chuck body about the axis to axially displace the jaws in the respective guides. An elastically deformable support washer bears axially forward on the actuating ring and has an inner periphery bearing axially backward on the rear chuck-body shoulder. The washer bears on the rear chuck-body shoulder over a radial distance equal to at most one-half its radial dimension such that the support ring projects at least halfway from the chuck body. A tightening sleeve axially and rotationally coupled to the actuating ring has a front axially rearwardly directed surface axially confronting the surface of the front chuck-body shoulder. The sleeve and ring are axially displaceable on rearward elastic deformation of the support washer from a position with the front shoulder surface out of contact with the front sleeve surface when the washer is generally undeformed and a position with the front sleeve surface bearing axially backward on the front shoulder surface when the washer is elastically rearwardly deformed.

17 Claims, 7 Drawing Sheets

LOCKABLE HAMMER-DRILL CHUCK

FIELD OF THE INVENTION

The present invention relates to a drill chuck. More particularly this invention concerns a lockable hammer-drill chuck.

BACKGROUND OF THE INVENTION

A standard drill chuck has a chuck body rotatable about a chuck axis and formed centered on the axis with an axially forwardly open tool receiving hole and an array of axially extending guides opening axially forward into the hole. Respective externally toothed jaws axially displaceable in the guides mesh with an internally threaded actuating ring rotatable on the chuck body about the axis to axially displace the jaws in the respective guides. This ring bears axially backward on the chuck body via a roller bearing in turn riding on a support washer set in chuck body. A tightening sleeve is axially and rotationally coupled to the actuating ring so that when it is rotated about the chuck axis in a tightening direction, the jaws move together and when oppositely rotated in a loosening direction the jaws move apart.

As described in U.S. Pat. No. 5,765,839 of G. Rohm the tightening sleeve is mounted on the chuck body at its rear end by means of a washer set in the rear end of the sleeve and riding on a rearwardly directed shoulder of the chuck body. The tightening sleeve is, however, mainly fixed centrally on the locking ring so any axial forces working on the sleeve are transmitted via the bearing to the support washer. This construction allows most of the chuck parts to be made principally by turning for a relatively low manufacture cost and allows the overall length of the chuck to be minimized.

Such construction has the disadvantage that the tightening sleeve can rock somewhat on the chuck body with some play in particular at the front of the chuck. When canted somewhat, the tightening ring can be sufficiently offcenter that it produces vibration or radial throw when the chuck is rotated at high speed.

OBJECTS OF THE INVENTION

It is therefore an object of the present invention to provide an improved drill chuck.

Another object is the provision of such an improved drill chuck which overcomes the above-given disadvantages, that is where the tightening sleeve is solidly and immovably secured to the chuck body at least when the chuck is tightened on a tool.

SUMMARY OF THE INVENTION

A drill chuck has according to the invention a chuck body rotatable about a chuck axis and formed centered on the axis with an axially forwardly open tool receiving hole, an array of axially extending guides opening axially forward into the hole, a rear axially forwardly directed shoulder and a front axially forwardly directed shoulder. Respective externally toothed jaws axially displaceable in the guides mesh with an internally threaded actuating ring rotatable on the chuck body about the axis to axially displace the jaws in the respective guides. An elastically deformable support washer bears axially forward on the actuating ring and has an inner periphery bearing axially backward on the rear chuck-body shoulder. The washer in accordance with the invention bears on the rear chuck-body shoulder over a radial distance equal to at most one-half its radial dimension such that the support ring projects at least halfway from the chuck body, allowing its outer periphery to be deformed elastically backward on tightening of the chuck. A tightening sleeve axially and rotationally coupled to the actuating ring has a front axially rearwardly directed surface axially confronting the surface of the front chuck-body shoulder. The sleeve and ring are axially displaceable on rearward elastic deformation of the support washer from a position with the front shoulder surface out of contact with the front sleeve surface when the washer is generally undeformed and a position with the front sleeve surface bearing axially backward on the front shoulder surface when the washer is elastically rearwardly deformed.

Thus once this chuck is tightened, the support washer deforms and the surface at the front end of the tightening sleeve bears solidly axially backward on the front shoulder of the chuck body. This locks the sleeve solidly to the chuck body on center, so the chuck can be driven at high speeds without vibrating. On the other hand when not tightened, the tightening sleeve is solely carried by the locking ring so that it can be rotated easily. Furthermore the binding of the tightening sleeve on the chuck body gives an easily felt signal to the user that the chuck has been tightened sufficiently. At the same time such engagement prevents over-tightening.

According to the invention the washer bears on the rear chuck-body shoulder over a radial distance equal to at most one-quarter the rear-shoulder radial dimension. This allows considerable deformation for smoothest possible operation.

A retaining washer set in the tightening sleeve bears axially forward on the actuating ring. This tightening sleeve includes a metallic outer sleeve part and a plastic inner sleeve part fixed in the outer part and in which the retaining washer is set. The retaining washer is axially rearward of the support washer. In addition the actuating ring includes a coupling ring having a rearwardly extending collar bearing axially rearward on the retaining washer. The mainly plastic tightening sleeve is quite light so that when subjected to sudden stops and starts its inertia will not be enough to loosen or tighten the chuck. Furthermore the softer inner part is somewhat compressible so that the chuck can be tightened smoothly.

In accordance with the invention at least one of the surfaces is constructed to increase the coefficient of friction thereof relative to the other of the surfaces. This effect can be achieved by a roughening of the one surface, by providing a soft friction-increasing coating on the one surface, by forming teeth on one or both of the surfaces, or by mounting a soft-friction-increasing washer between the surfaces. This friction washer is of a material having a higher coefficient of friction than either of the surfaces and can be axially displaceable on the chuck body. The surfaces are complementarily frustoconical and centered on the axis or are planar. Frustoconical surfaces ensure perfect centering of the tightening sleeve on the chuck body when the chuck is tightened.

A protective cap secured to the chuck body covers a front end of the tightening sleeve. In addition the chuck body is formed centered on the axis with an array of outwardly directed teeth. A coupling sleeve between the tightening sleeve and the chuck body is angularly fixed to the actuating ring and abutments on the tightening sleeve permit angular movement of the coupling sleeve relative to the tightening sleeve between a pair of end positions. A locking member angularly fixed on the coupling sleeve is displaceable between a locking position engaging the teeth and preventing rotation of the body relative to the coupling ring and a freeing position permitting rotation of the body relative to the coupling sleeve. A cam on the tightening sleeve is engageable with the locking member for displacing the locking member into the locking position when the coupling sleeve is in one of its end positions and for displacing the locking member into the freeing position when the coupling ring is in the other of its end positions. This structure allows the chuck to be locked.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
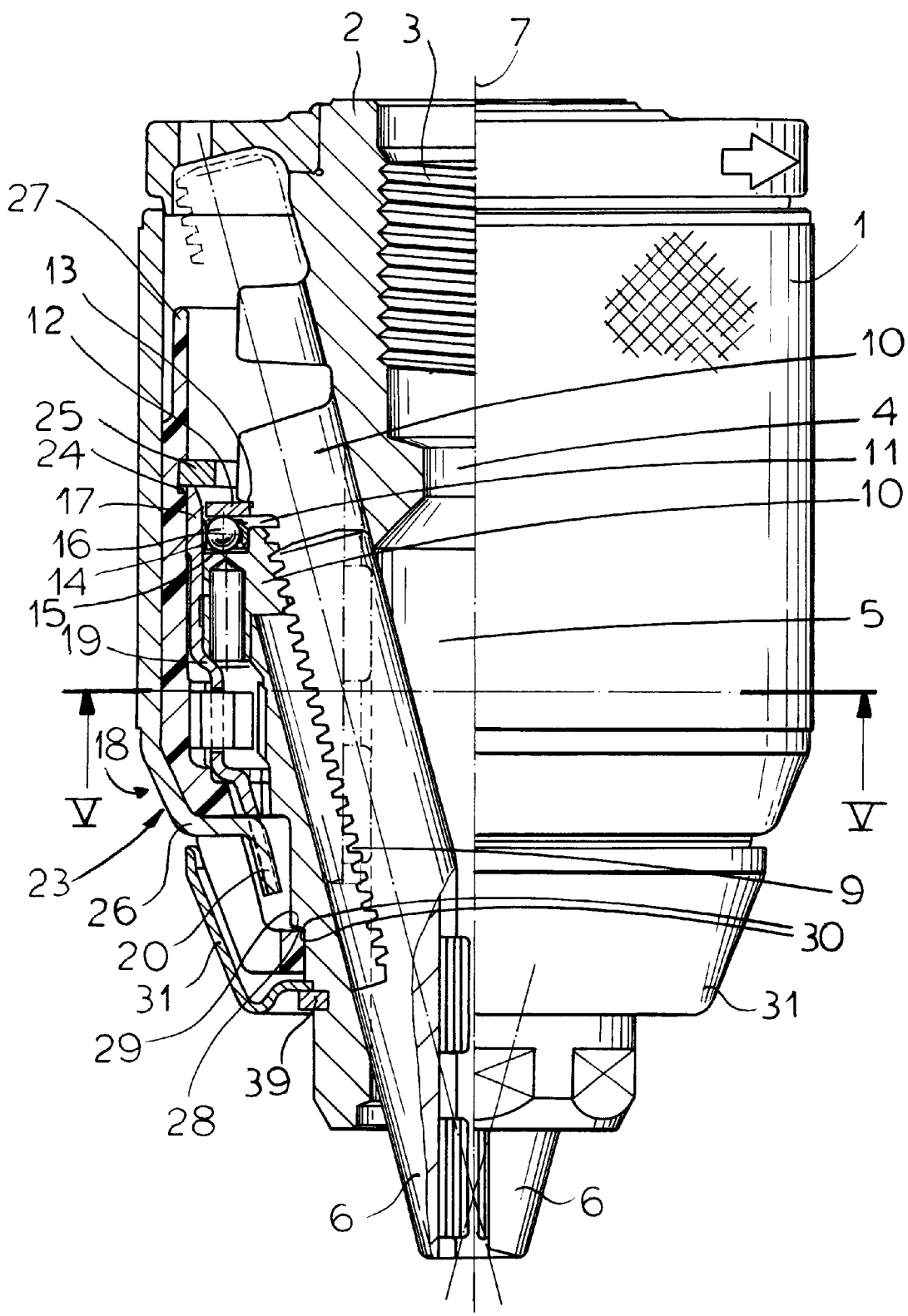
FIG. 1 is a side view partly in axial section through the chuck according to the invention.

As seen in FIGS. 1 through 6 a chuck 1 according to the invention has a chuck body 2 centered on an axis 7 and formed with a rearwardly open threaded hole 3 adapted to receive the spindle of a power drill, a front hole 5 adapted to receive the rear end of a drill bit or other tool, and a communicating passage 4 that allows an unillustrated hammer rod of the power drill to act directly on the rear end of the unillustrated bit. Three identical jaws 6 are received in angled guide passages 8 opening into the front hole 5. Each jaw 6 has an outer edge formed with a row of teeth 9 meshing with an internal screwthread of a multipart actuating ring 10 itself set in a radially outwardly open groove 11 formed in the chuck body 2.

This actuating ring 10 bears axially forward directly on the front flank of the groove 11 and axially backward via a roller bearing 14 comprised of balls 16 received in a cage 15 on a support washer 12 itself bearing on an axially forwardly directed shoulder 13 of the body 2. Here the shoulder 13 has a radial dimension equal to about 25% of the radial dimension of the washer 12 so that this washer 12 is cantilevered outward, with about 75% of itself unsupported.

The actuating ring 10 is held together by a rear end or collar 17 of a coupling sleeve 19 centered on the axis 7 and mounted between the chuck body 2 and a tightening sleeve 18 having an inner plastic sleeve part 27 and a metallic outer sleeve part 26. The sleeve 19 is fixed to the actuating ring 10. As described in above-cited U.S. Pat. No. 5,765,839 the outer sleeve part 26 has axially forwardly directed fingers 20 (FIG. 4) received with considerable angular play between abutments formed in cutouts of the sleeve 19 to form a lost-motion coupling permitting limited relative angular movement of the sleeves 18 and 19.

Figure 5:
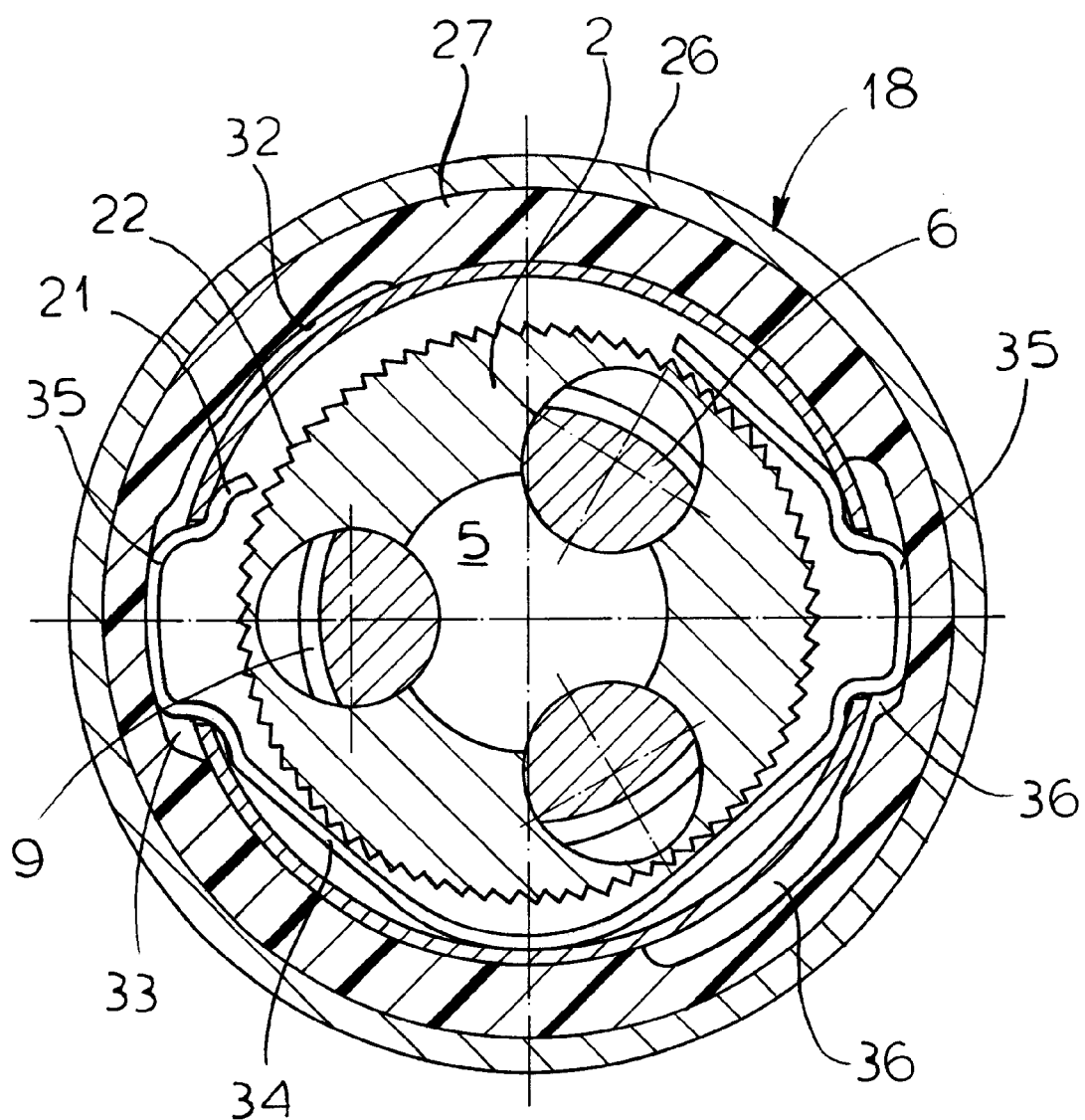
FIG. 5 is a section taken along line V—V of FIG. 1.
Figure 6:
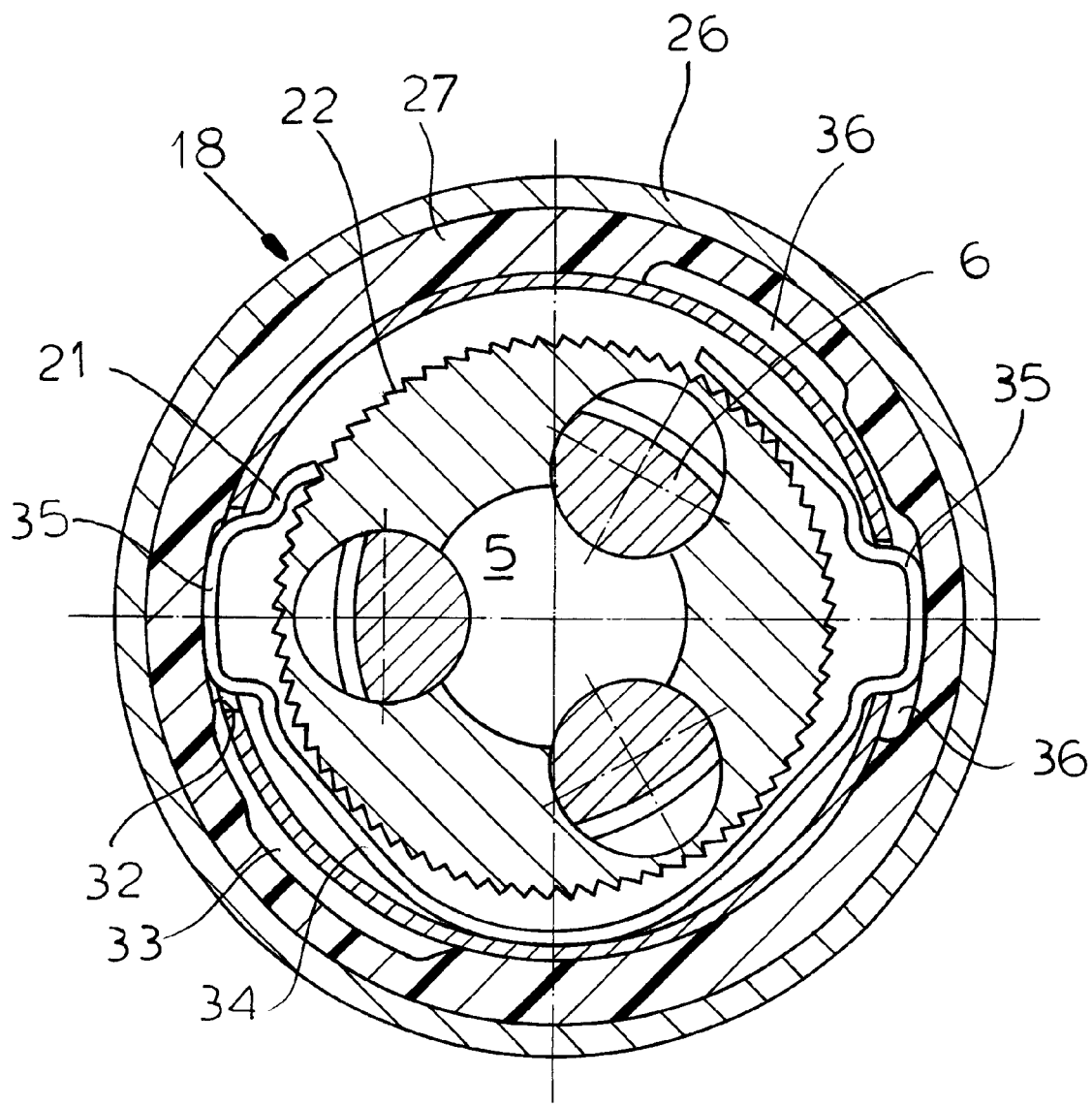
FIG. 6 is a view like FIG. 5 but with the chuck in the latched or locked position.

A locking mechanism 23 such as described in above-cited U.S. Pat. No. 5,765,839 comprises as shown in FIGS. 5 and 6 a spring-steel band 34 acting as a locking member and having a tip 21 engageable in sawteeth 22 formed in the chuck body 2. The band 34 is formed with two diametrically offset and radially outwardly projecting bumps 35. One of the bumps 35 can move between a pair of radially inwardly open and angularly offset pockets 36 formed in the inner sleeve part 27 that define end positions between the maximum relative angular excursion of the sleeves 18 and 19. The other bump 35 can move between a relatively deep radially inwardly open pocket 33 and a relatively shallow pocket 32. When in the deep pocket 33, the locking tip 21 is clear of the teeth 22 and, when in the shallow pocket 32, the tip 21 engages the teeth 22 and locks the chuck body 2 against rotation relative to the sleeves 18 and 19.

Thus as the chuck is closed on a tool the locking member 34 will to start with be in the outer position of FIG. 5 with the tip 21 clear of the teeth 22. There is, however, enough springiness in this member 34 to rotationally couple the sleeves 18 and 19 so that, as the sleeve 18 is rotated in a forward tightening direction, the actuating ring 10 will be entrained to move the jaws 6 together. Once the jaws 6 seat on a tool or workpiece, further rotation of the actuating ring 10 will be resisted, thereby also stopping rotation of the coupling sleeve 19. The sleeve 18 will continue to turn, pushing in the tip 21 to lock the chuck body 2 against loosening as shown in FIG. 6. Once the tip 21 is engaged with the sawteeth 22, it is impossible for the sleeves 18 and 19 along with the actuating ring 10 to rotate relative to the chuck body 2 in an opposite loosening direction so that the chuck 1 cannot loosen. On manual loosening, the sleeve 18 will initially rotate free of the sleeve 19 to move the tip 21 to the outer freeing position and further rotation of the sleeve 18 will also rotate the sleeve 19 and, with it, the actuating ring 10 to open the chuck 1.

The inner sleeve part 27 is formed rearward of the actuating ring 10 with a radially inwardly open groove 24 in which is snapped another ring or washer 25 which bears axially forward (down in FIG. 1) on the rear end of the coupling sleeve 19. In addition the inner sleeve part 27 has a rearwardly directed planar and annular surface 28 confronting a complementary forwardly directed shoulder surface 29 formed at the front end of the chuck body 2, with the two surfaces 28 and 29 having a coating 30 of friction-increasing material or tooth formations to increase friction between them. A sheet-metal protective cap 31 is held in place by a snap ring 37 to protect the front end of the plastic inner sleeve part 27.

Figure 2:
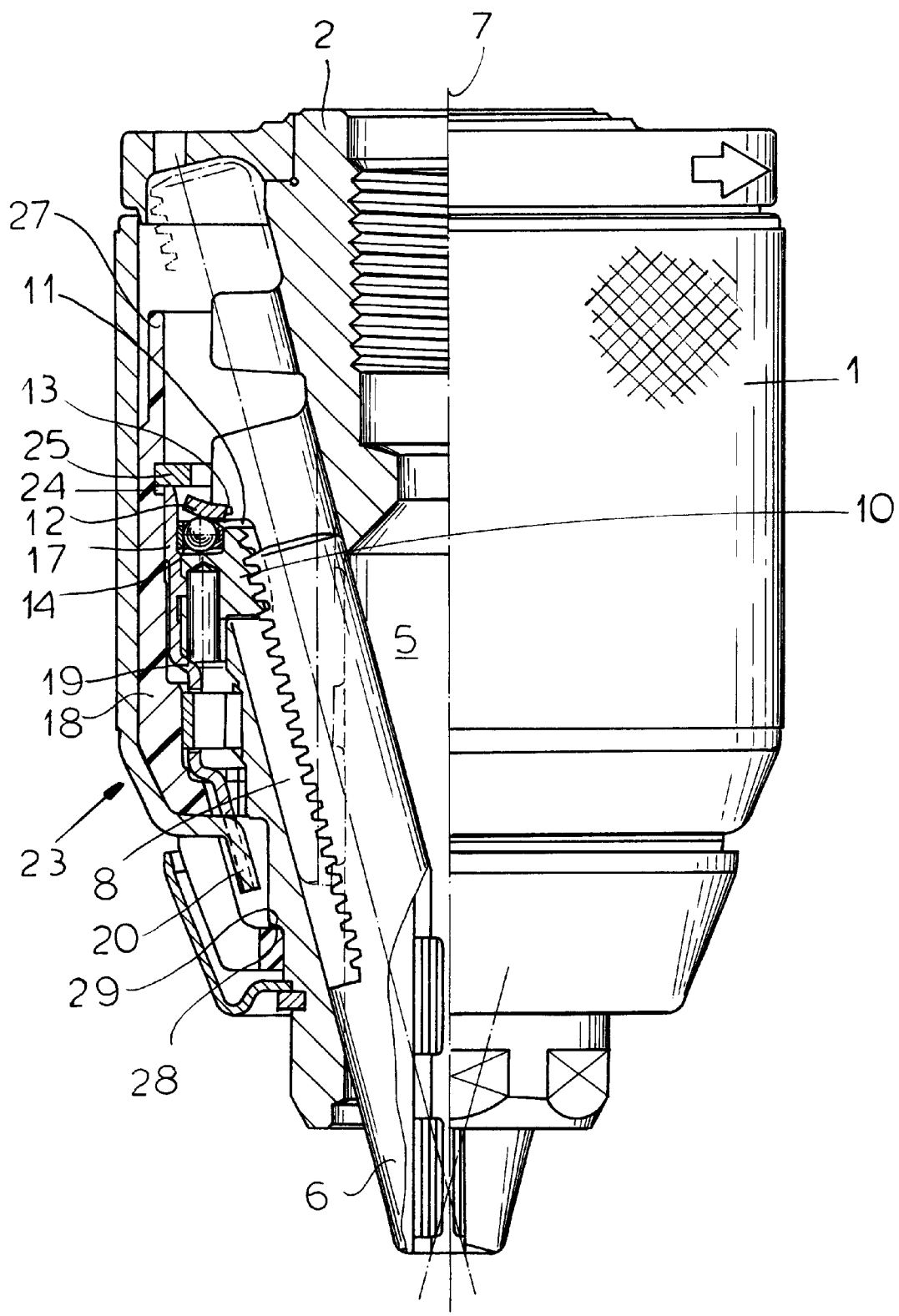
FIG. 2 is a view like FIG. 1 but with the chuck tightened forcibly.

In the open position of the chuck 1 as shown in FIG. 1 the surfaces 28 and 29 are spaced apart by an axial distance equal to the axial distance the actuating ring 10 and sleeve 18 can be pushed back as shown in FIG. 2 when the chuck 1 is tightened with deformation of the support ring 12. This distance here is several tenths of a millimeter. Thus these surfaces 28 and 29 will only engage each other when the chuck 1 is tightened, solidly locking the sleeve 18 to the chuck body 2.

Figure 3:
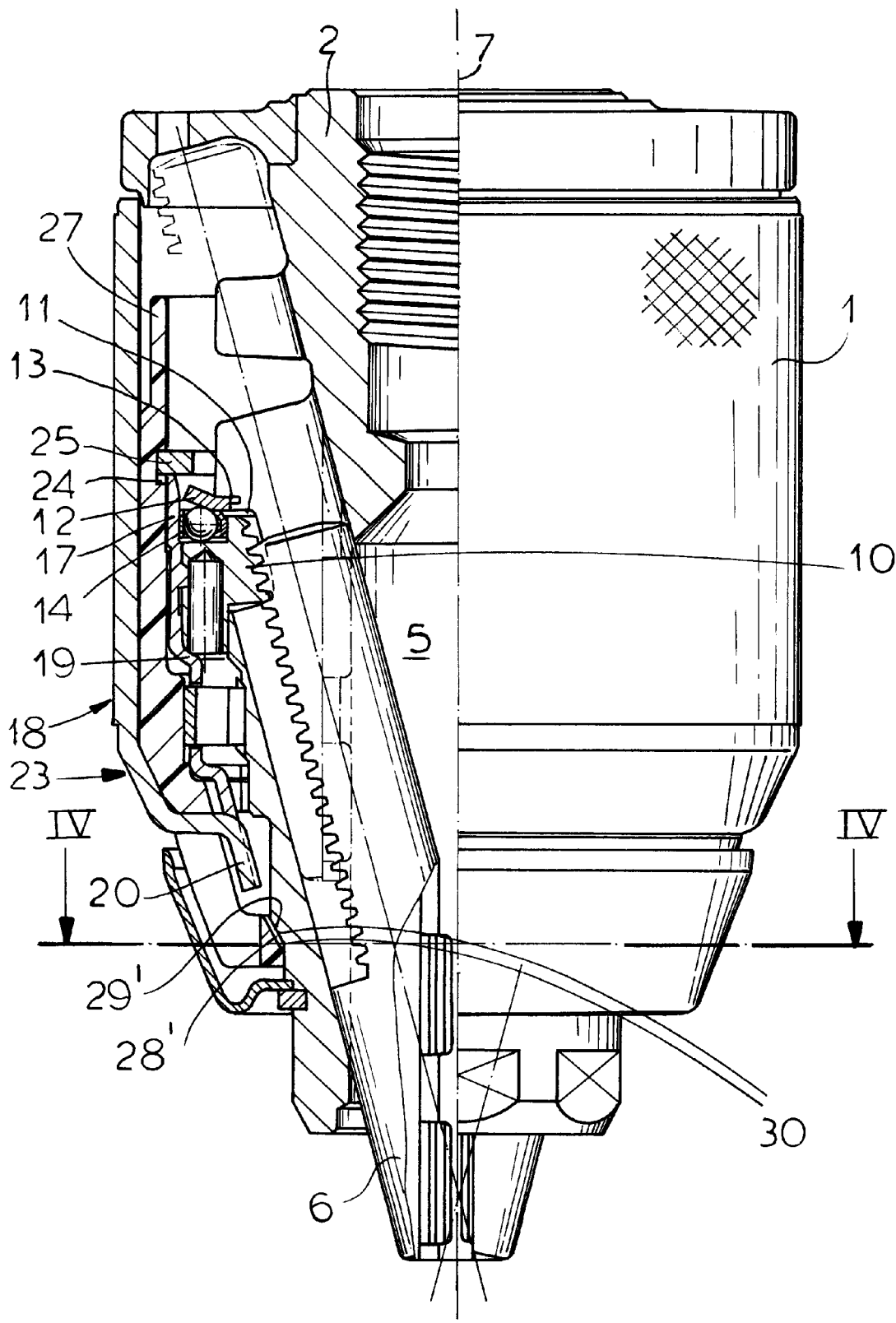
FIG. 3 is a view like FIG. 1 of an alternative system in accordance with the invention.
Figure 4:
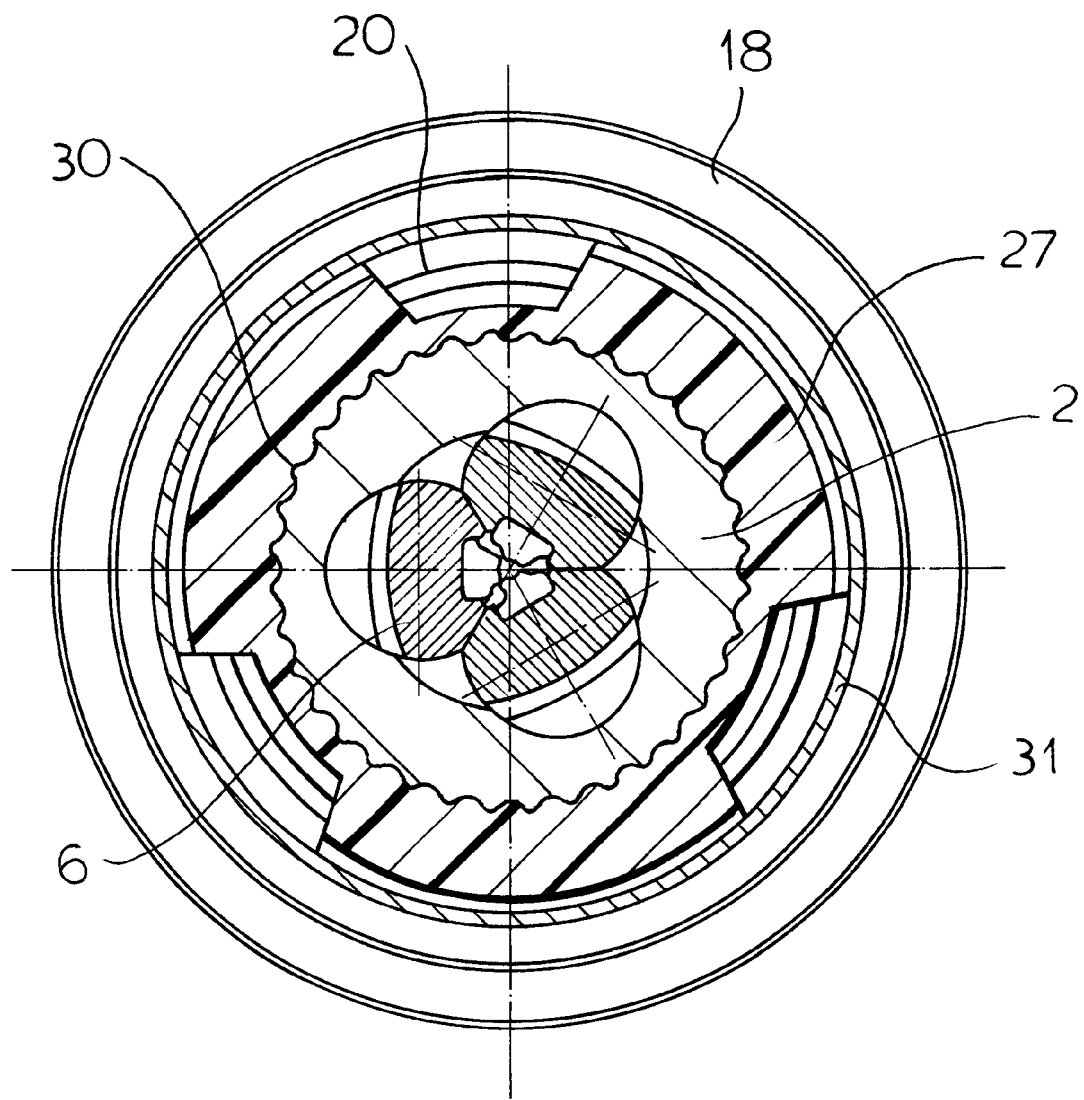
FIG. 4 is a section taken along line IV—IV of FIG. 3.

FIG. 3 shows an arrangement where the surfaces 28' and 29' are complementarily frustoconical for good wedging action when they meet and perfect centering of the sleeve 18 on the body 2.

Figure 7:
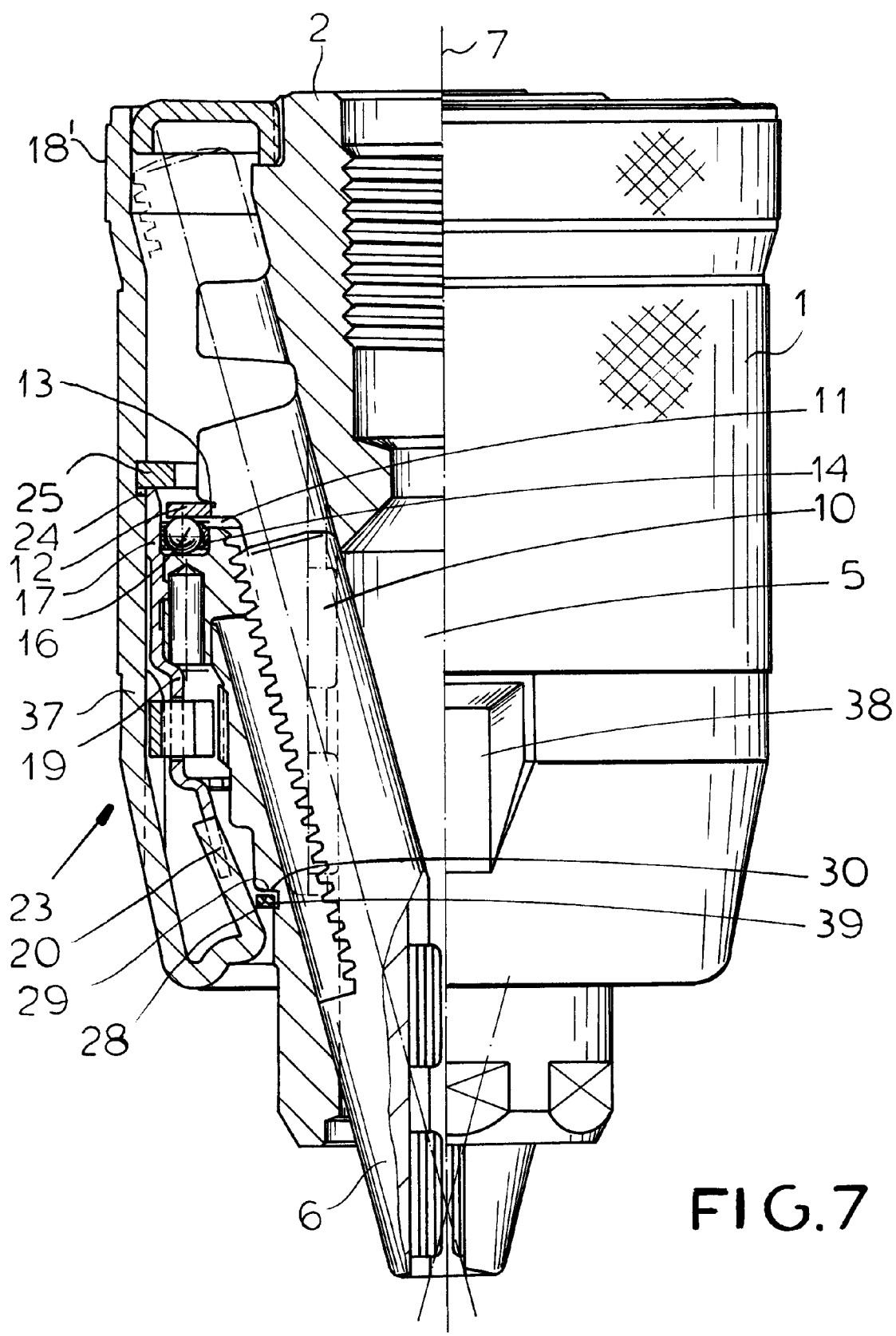
FIG. 7 is a view like FIG. 1 of yet another chuck according to the invention.

In FIG. 7 the sleeve 18' is made of metal and of a single piece, itself formed with the coupling fingers 20, the surface 28, and the groove 24. Here a plastic friction-increasing washer 39 is provided between the surfaces 29 and 30 to increase friction therebetween. The sleeve 18' is formed with indentations 38 that form the internal pockets 32, 33, and 36.

What is claimed is:

1. A drill chuck comprising:
   a chuck body rotatable about a chuck axis and formed centered on the axis with
   an axially forwardly open tool receiving hole,
   an array of axially extending guides opening axially forward into the hole,
   an axially forwardly directed rear shoulder and
   a front shoulder having an axially forwardly directed front surface;
   respective externally toothed jaws axially displaceable in the guides;
   an internally threaded actuating ring meshing with the jaws and rotatable on the chuck body about the axis to axially displace the jaws in the respective guides;
   an elastically deformable support washer bearing axially forward on the actuating ring and having an inner periphery bearing axially backward on the rear chuck-body shoulder, the washer having a radial dimension and bearing on the rear chuck-body shoulder over a radial distance equal to at most one-half the washer dimension such that the support ring projects at least halfway from the chuck body; and
   a tightening sleeve axially and rotationally coupled to the actuating ring and having an axially rearwardly directed front surface axially confronting the front chuck-body shoulder surface, the sleeve and ring being axially displaceable on rearward elastic deformation of the support washer from a forward position with the front shoulder surface out of contact with the front sleeve surface when the washer is generally undeformed and a rear position with the front sleeve surface bearing axially backward on the front shoulder surface when the washer is elastically rearwardly deformed.

2. The drill chuck defined in claim 1 wherein the washer bears on the rear chuck-body shoulder over a radial distance equal to at most one-quarter the washer radial dimension.

3. The drill chuck defined in claim 1, further comprising
   a retaining washer seated in the tightening sleeve and bearing axially forward on the actuating ring.

4. The drill chuck defined in claim 3, wherein the tightening sleeve includes:
   a metallic outer sleeve part, and
   a plastic inner sleeve part fixed in the outer part and in which the retaining washer is set.

5. The drill chuck defined in claim 3 wherein the retaining washer is axially rearward of the support washer.

6. The drill chuck defined in claim 3 wherein the actuating ring includes a coupling ring having a rearwardly extending collar bearing axially rearward on the retaining washer.

7. A drill chuck comprising:
   a chuck body rotatable about a chuck axis and formed centered on the axis with
   an axially forwardly open tool receiving hole,
   an array of axially extending guides opening axially forward into the hole,
   an axially forwardly directed rear shoulder and
   a front shoulder having an axially forwardly directed front surface;
   respective externally toothed jaws axially displaceable in the guides;
   an internally threaded actuating ring meshing with the jaws and rotatable on the chuck body about the axis to axially displace the jaws in the respective guides;
   an elastically deformable support washer bearing axially forward on the actuating ring and having an inner periphery bearing axially backward on the rear chuck-body shoulder, the washer having a radial dimension and bearing on the rear chuck-body shoulder over a radial distance equal to at most one-half the washer dimension such that the support ring projects at least halfway from the chuck body;
   a tightening sleeve axially and rotationally coupled to the actuating ring and having an axially rearwardly directed front surface axially confronting the front chuck-body shoulder surface, the sleeve and ring being axially displaceable on rearward elastic deformation of the support washer from a forward position with the front shoulder surface out of contact with the front sleeve surface when the washer is generally undeformed and a rear position with the front sleeve surface bearing axially backward on the front shoulder surface when the washer is elastically rearwardly deformed; and
   means on at least one of the surfaces for increasing the coefficient of friction thereof relative to the other of the surfaces.

8. The drill chuck defined in claim 7 wherein the means is a roughening of the one surface.

9. The drill chuck defined in claim 7 wherein the means is a soft friction-increasing coating on the one surface.

10. The drill chuck defined in claim 7 wherein the means is a soft-friction-increasing washer between the surfaces.

11. The drill chuck defined in claim 10 wherein the friction-increasing washer is of a material having a higher coefficient of friction than either of the surfaces.

12. The drill chuck defined in claim 10 wherein the friction-increasing washer is axially displaceable on the chuck body.

13. The drill chuck defined in claim 7 wherein the means is teeth formed on the one surface.

14. The drill chuck defined in claim 1 wherein the surfaces are complementarily frustoconical and centered on the axis.

15. The drill chuck defined in claim 1 wherein the surfaces are planar.

16. The drill chuck defined in claim 1, further comprising
   a protective cap secured to the chuck body and covering a front end of the tightening sleeve.

17. The drill chuck defined in claim 1 wherein the chuck body is formed centered on the axis with an array of outwardly directed teeth, the chuck further comprising:
   a coupling sleeve between the tightening sleeve and the chuck body and angularly fixed to the actuating ring;
   means including abutments on the tightening sleeve for angular movement of the coupling sleeve relative to the tightening sleeve between a pair of end positions;
   a locking member angularly fixed on the coupling sleeve and displaceable between a locking position engaging the teeth and preventing rotation of the body relative to the coupling ring and a freeing position permitting rotation of the body relative to the coupling sleeve; and
   cam means on the tightening sleeve engageable with the locking member for displacing the locking member into the locking position when the coupling sleeve is in one of its end positions and for displacing the locking member into the freeing position when the coupling ring is in the other of its end positions.

* * * * *